United States Patent
Olderdissen

(10) Patent No.: US 10,367,883 B2
(45) Date of Patent: Jul. 30, 2019

(54) COMPUTING RESOURCE MANAGEMENT USING DEDICATED LEADERSHIP POOL

(71) Applicant: Nutanix, Inc., San Jose, CA (US)

(72) Inventor: Jan Olderdissen, Herrenberg (DE)

(73) Assignee: Nutanix, Inc., San Jose, CA (US)

(*) Notice: Subject to any disclaimer, the term of this patent is extended or adjusted under 35 U.S.C. 154(b) by 398 days.

(21) Appl. No.: 15/456,298

(22) Filed: Mar. 10, 2017

(65) Prior Publication Data

US 2018/0262442 A1 Sep. 13, 2018

(51) Int. Cl.
*H04L 29/08* (2006.01)

(52) U.S. Cl.
CPC ........ *H04L 67/101* (2013.01); *H04L 67/1008* (2013.01)

(58) Field of Classification Search
CPC ............... H04L 67/101; H04L 67/1008; G06F 9/45533; G06F 2212/151; G06F 21/53; G06F 9/45504; G06F 2009/45595; G06F 2009/4557; G06F 2009/45575; H04N 21/4437; H04N 21/443
See application file for complete search history.

(56) References Cited

U.S. PATENT DOCUMENTS

| 8,549,518 B1 | 10/2013 | Aron et al. |
| 8,601,473 B1 | 12/2013 | Aron et al. |
| 8,850,130 B1 | 9/2014 | Aron et al. |
| 9,772,866 B1 | 9/2017 | Aron et al. |

OTHER PUBLICATIONS

Poitras, Steven. "The Nutanix Bible" (Oct. 15, 2013), from http://stevenpoitras.com/the-nutanix-bible/ (Publication date based on indicated capture date by Archive.org; first publication date unknown).
Poitras, Steven. "The Nutanix Bible" (Jan. 11, 2014), from http://stevenpoitras.com/the-nutanix-bible/ (Publication date based on indicated capture date by Archive.org; first publication date unknown).
Poitras, Steven. "The Nutanix Bible" (Jun. 20, 2014), from http://stevenpoitras.com/the-nutanix-bible/ (Publication date based on indicated capture date by Archive.org; first publication date unknown).
Poitras, Steven. "The Nutanix Bible" (Jan. 7, 2015), from http://stevenpoitras.com/the-nutanix-bible/ (Publication date based on indicated capture date by Archive.org; first publication date unknown).

(Continued)

*Primary Examiner* — Wing F Chan
*Assistant Examiner* — Billy H Ng
(74) *Attorney, Agent, or Firm* — Dorsey & Whitney LLP

(57) ABSTRACT

Examples of systems described herein include resource management processes which may dedicate a portion of resources (e.g. memory) to serve as a dedicated leadership resource pool, accessible to only those instances of services which are designated as having a leadership role. In some examples, if sufficient resources are not available in the dedicated leadership resource pool, an instance of a service running on that computing node may decline to serve in the leadership role. Accordingly, memory and allocation of leaders may be better controlled across the distributed system in some examples.

28 Claims, 5 Drawing Sheets

(56) References Cited

OTHER PUBLICATIONS

Poitras, Steven. "The Nutanix Bible" (Jun. 9, 2015), from http://stevenpoitras.com/the-nutanix-bible/ (Publication date based on indicated capture date by Archive.org; first publication date unknown).
Poitras, Steven. "The Nutanix Bible" (Sep. 4, 2015), from https://nutanixbible.com/.
Poitras, Steven. "The Nutanix Bible" (Jan. 12, 2016), from https://nutanixbible.com/.
Poitras, Steven. "The Nutanix Bible" (Jun. 9, 2016), from https://nutanixbible.com/.
Poitras, Steven. "The Nutanix Bible" (Jan. 3, 2017), from https://nutanixbible.com/.
Poitras, Steven. "The Nutanix Bible" (Jun. 8, 2017), from https://nutanixbible.com/.
Poitras, Steven. "The Nutanix Bible" (Jan. 3, 2018), from https://nutanixbible.com/.
Poitras, Steven. "The Nutanix Bible" (Jun. 25, 2018), from https://nutanixbible.com/.
Poitras, Steven. "The Nutanix Bible" (Jan. 8, 2019), from https://nutanixbible.com/.

COMPUTING RESOURCE MANAGEMENT USING DEDICATED LEADERSHIP POOL

TECHNICAL FIELD

Examples described herein pertain to distributed and cloud computing systems. Examples of memory management using dedicated leadership pools are described.

BACKGROUND

A virtual machine or a "VM" generally refers to a specific software-based implementation of a machine in a virtualized computing environment, in which the hardware resources of a real computer (e.g., CPU, memory, etc.) are virtualized or transformed into underlying support for the virtual machine that can run its own operating system and applications on the underlying physical resources just like a physical computer.

Virtualization generally works by inserting a thin layer of software directly on the computer hardware or on a host operating system. This layer of software contains a virtual machine monitor or "hypervisor" that allocates hardware resources dynamically and transparently. Many different types of hypervisors exist, such as ESX(i), Hyper-V, Xen-Server, etc.

Many instances of a particular process may be executing in a distributed system, with instances of the process executing on multiple computing nodes of the distributed system. One of the instances of the process in the distributed system may be selected as a leadership process, to perform certain functions utilized by other instances of the process. Generally, the instance of the particular process serving as the leadership process may utilize a greater amount of memory than when not operating as a leadership process.

DETAILED DESCRIPTION

Certain details are set forth below to provide a sufficient understanding of embodiments of the invention. However, it will be clear to one skilled in the art that embodiments of the invention may be practiced without one or more of these particular details. In some instances, wireless communication components, circuits, control signals, timing protocols, computing system components, and software operations have not been shown in detail in order to avoid unnecessarily obscuring the described embodiments of the invention.

Figure 1:
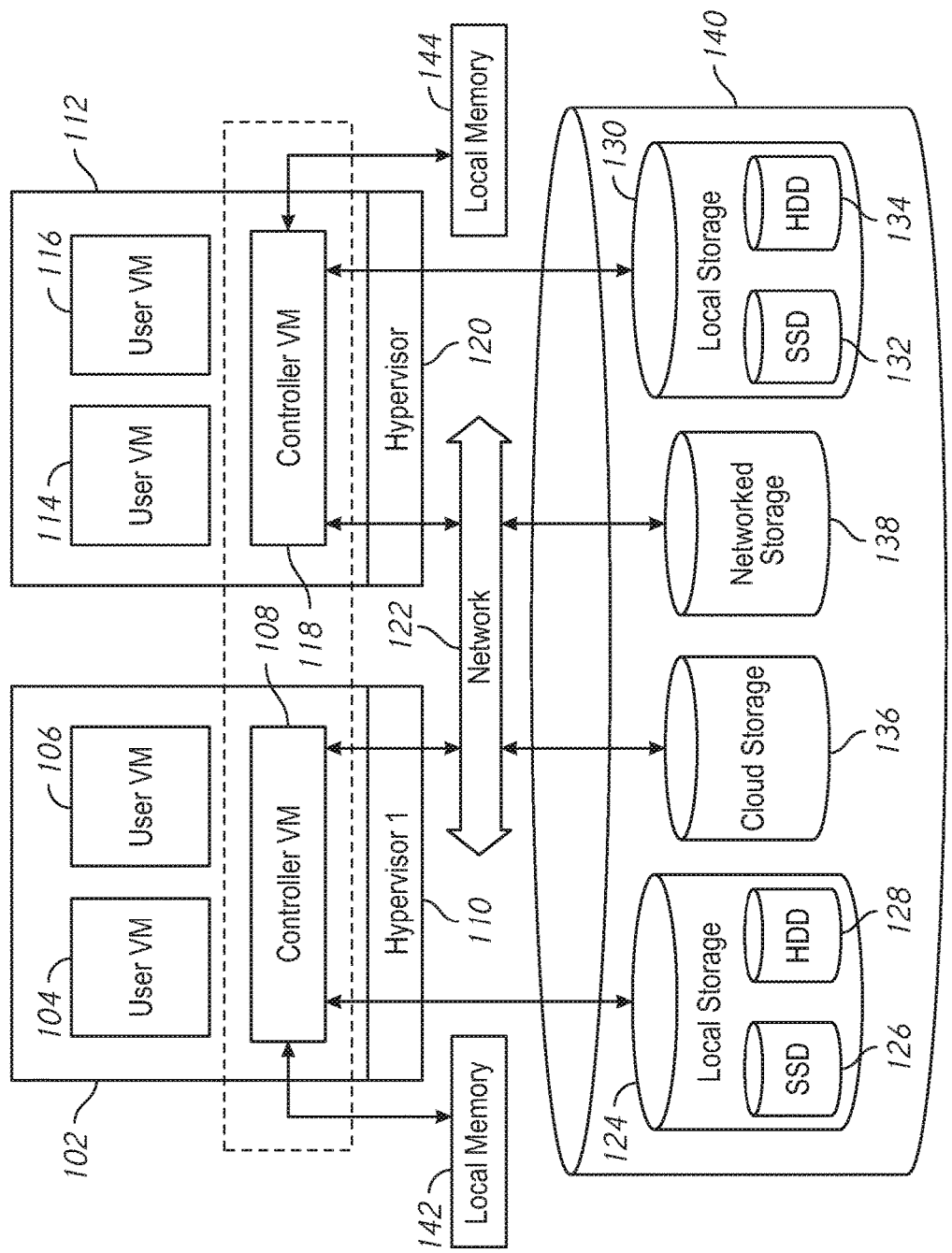
FIG. 1 is a block diagram of a distributed computing system, in accordance with an embodiment of the present invention.

FIG. 1 is a block diagram of a distributed computing system, in accordance with an embodiment of the present invention. The distributed computing system of FIG. 1 generally includes computing node 102 and computing node 112 and storage 140 connected to a network 122. The network 122 may be any type of network capable of routing data transmissions from one network device (e.g., computing node 102, computing node 112, and storage 140) to another. For example, the network 122 may be a local area network (LAN), wide area network (WAN), intranet, Internet, or a combination thereof. The network 122 may be a wired network, a wireless network, or a combination thereof.

The storage 140 may include local storage 124, local storage 130, cloud storage 136, and networked storage 138. The local storage 124 may include, for example, one or more solid state drives (SSD 126) and one or more hard disk drives (HDD 128). Similarly, local storage 130 may include SSD 132 and HDD 134. Local storage 124 and local storage 130 may be directly coupled to, included in, and/or accessible by a respective computing node 102 and/or computing node 112 without communicating via the network 122. Cloud storage 136 may include one or more storage servers that may be stored remotely to the computing node 102 and/or computing node 112 and accessed via the network 122. The cloud storage 136 may generally include any type of storage device, such as HDDs, SSDs, or optical drives. Networked storage 138 may include one or more storage devices coupled to and accessed via the network 122. The networked storage 138 may generally include any type of storage device, such as HDDs, SSDs, or optical drives. In various embodiments, the networked storage 138 may be a storage area network (SAN).

Local memory 142 and 144 may be provided for use by controller VMs 108 and 118 respectively. The local memory 142 and 144 may be implemented using, for example, dynamic random access memory (DRAM), static random access memory (SRAM), Flash, and/or other memory technologies.

The computing node 102 is a computing device for hosting VMs in the distributed computing system of FIG. 1. The computing node 102 may be, for example, a server computer, a laptop computer, a desktop computer, a tablet computer, a smart phone, or any other type of computing device. The computing node 102 may include one or more physical computing components, such as processors.

The computing node 102 is configured to execute a hypervisor 110, a controller VM 108 and one or more user VMs, such as user VMs 104, 106. The user VMs including user VM 104 and user VM 106 are virtual machine instances executing on the computing node 102. The user VMs including user VM 104 and user VM 106 may share a virtualized pool of physical computing resources such as physical processors and storage (e.g., storage 140). The user VMs including user VM 104 and user VM 106 may each have their own operating system, such as Windows or Linux. While a certain number of user VMs are shown, generally any number may be implemented.

The hypervisor 110 may be any type of hypervisor. For example, the hypervisor 110 may be ESX, ESX(i), Hyper-V, KVM, or any other type of hypervisor. The hypervisor 110 manages the allocation of physical resources (such as storage 140 and physical processors) to VMs (e.g., user VM 104, user VM 106, and controller VM 108) and performs various VM related operations, such as creating new VMs and cloning existing VMs. Each type of hypervisor may have a hypervisor-specific API through which commands to perform various operations may be communicated to the particular type of hypervisor. The commands may be formatted in a manner specified by the hypervisor-specific API for that type of hypervisor. For example, commands may utilize a syntax and/or attributes specified by the hypervisor-specific API.

Controller virtual machines (Controller VMs) described herein, such as the controller VM 108 and/or controller VM 118, may provide services for the user VMs in the computing node. As an example of functionality that a controller VM may provide, the controller VM may provide distributed storage services that allow for management of storage 140 as a unified resource. In some examples, the controller VM 108 may include a hypervisor independent interface software layer that provides a uniform API through which hypervisor commands may be provided. Generally, the interface through which a user or VM interacts with the hypervisor may not depend on the particular type of hypervisor being used. For example, the API that is invoked to create a new VM instance may appear the same to a user regardless of what hypervisor the particular computing node is executing (e.g. an ESX(i) hypervisor or a Hyper-V hypervisor). The controller VM 108 may receive a command through its uniform interface (e.g., a hypervisor agnostic API) and convert the received command into the hypervisor specific API used by the hypervisor 110.

The computing node 112 may include user VM 114, user VM 116, a controller VM 118, and a hypervisor 120. The user VM 114, user VM 116, the controller VM 118, and the hypervisor 120 may be implemented similarly to analogous components described above with respect to the computing node 102. For example, the user VM 114 and user VM 116 may be implemented as described above with respect to the user VM 104 and user VM 106. The controller VM 118 may be implemented as described above with respect to controller VM 108. The hypervisor 120 may be implemented as described above with respect to the hypervisor 110. In the embodiment of FIG. 1, the hypervisor 120 may be a different type of hypervisor than the hypervisor 110. For example, the hypervisor 120 may be Hyper-V, while the hypervisor 110 may be ESX(i).

The controller VM 108 and controller VM 118 may communicate with one another via the network 122. By linking the controller VM 108 and controller VM 118 together via the network 122, a distributed network of computing nodes including computing node 102 and computing node 112, can be created.

Controller VMs, such as controller VM 108 and controller VM 118, may each execute a variety of services and may coordinate, for example, through communication over network 122. Services running on controller VMs may utilize an amount of local memory to support their operations. For example, services running on controller VM 108 may utilize memory in local memory 142. Services running on controller VM 118 may utilize memory in local memory 144. Moreover, multiple instances of the same service may be running throughout the distributed system—e.g. a same services stack may be operating on each controller VM. For example, an instance of a service may be running on controller VM 108 and a second instance of the service may be running on controller VM 118. Generally, one instance of these services may be designated as having a leadership role and may provide some functionality for multiple instances of the service (e.g. coordination, control). When operating in a leadership role, the instance of the service may require a greater amount of local memory than when not operating in a leadership role. Accordingly, if too many instances of services running on a single computing node are designated in a leadership role, it may stress and/or exceed available memory.

Examples described herein include memory management processes which may dedicate a portion of memory (e.g. a portion of local memory 142 and/or local memory 144) to serve as a dedicated leadership memory pool, accessible to only those instances of services which are designated as having a leadership role. In some examples, if sufficient memory is not available in the dedicated leadership memory pool, an instance of a service running on that computing node may decline to serve in the leadership role. Accordingly, memory and allocation of leaders may be better controlled across the distributed system in some examples.

Figure 2:
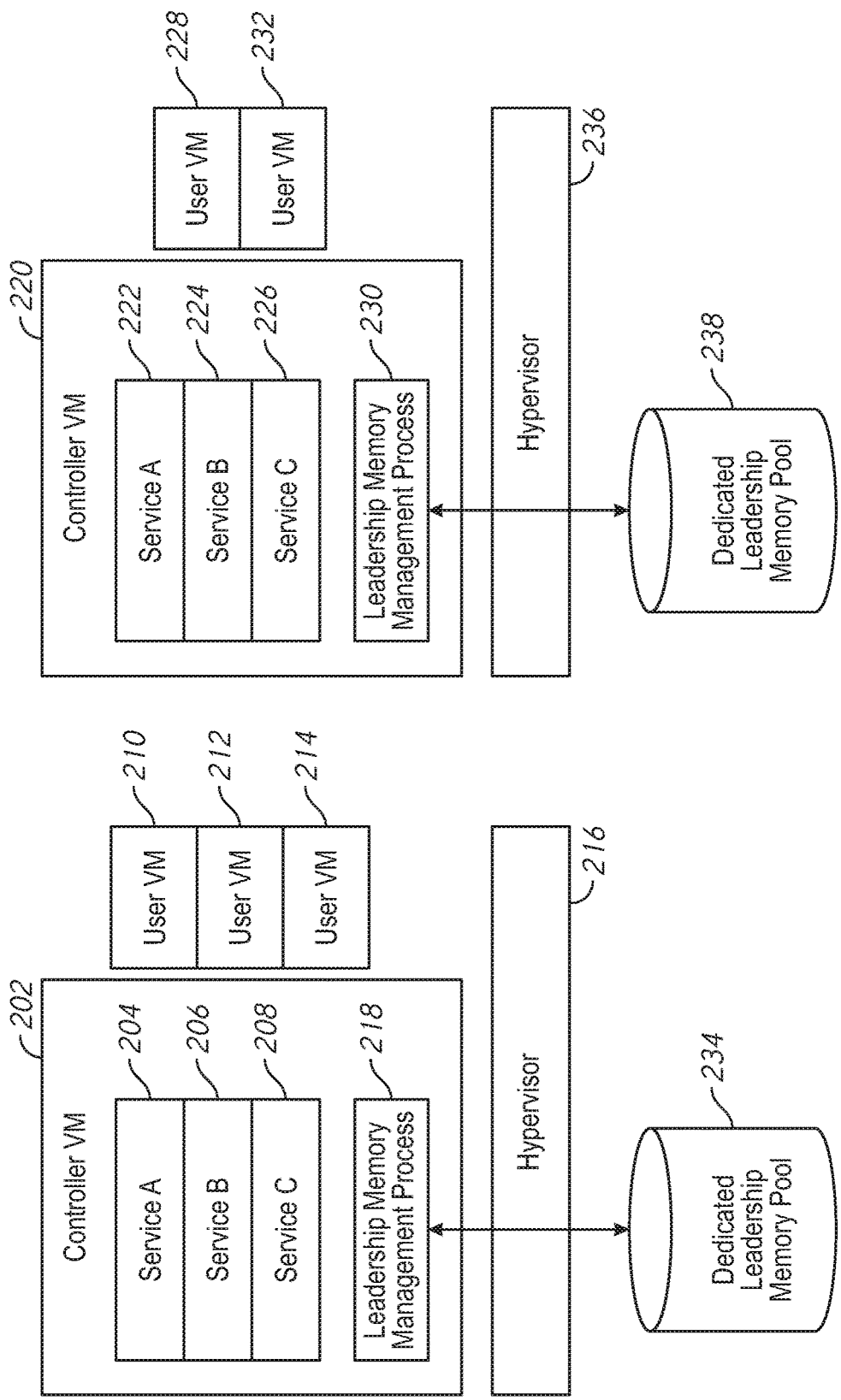
FIG. 2 is a schematic illustration of multiple computing nodes arranged in accordance with examples described herein.

FIG. 2 is a schematic illustration of multiple computing nodes arranged in accordance with examples described herein. FIG. 2 illustrates controller VM 202 and controller VM 220. The controller VM 202 and controller VM 220 may be used to implement and/or may be implemented by controller VM 108 and/or controller VM 118 of FIG. 1 in some examples. The controller VM 202 may operate on one computing node, while the controller VM 220 may operate on another computing node. As described with reference to FIG. 1, the controller VMs may communicate over a network. While two controller VMs are shown in FIG. 2, any number may be used, generally with one controller VM provided per computing node.

The controller VM 202 supports user VM 210, user VM 212, and user VM 214. While three user VMs are shown in FIG. 2, generally any number may be used. The controller VM 202 may utilize hypervisor 216.

The controller VM 220 supports user VM 214 and user VM 228. While two user VMs are shown, generally any number may be used. The controller VM 220 may utilize hypervisor 236.

Each controller VM in the distributed system of FIG. 2 may run a services stack—e.g. a plurality of services which may each provide a functionality or set of functionalities. The services stack in FIG. 12 includes service A, service B, and service C. While three services are shown, any number may generally be present. Moreover, the services stacks on controller VM 202 and controller VM 220 are shown to be the same—e.g. both including service A, service B, and service C. In some examples, the services stacks may be different on different computing nodes (e.g. different controller VMs). In the example of FIG. 2, controller VM 202 includes service A 204, service B 206, and service C 208. Controller VM 220 includes service A 222, service B 224, and service C 226. Service A 204 and service A 222 may be referred two as two instances of service A. Service B 206 and service B 224 may be referred to as two instances of service B. Service C 208 and service C 226 may be referred to as two instances of service C. Generally, each service (e.g. service A, service B, and service C) may perform a common function for the computing nodes in the distributed system. Common functions that may be performed vary in accordance with the wide array of services that may be provided, and include registration services, authentication services, interface (e.g. translation) services, etc.

Generally, in a distributed system, one instance of a service (e.g. one instance of service A, one instance of service B, and one instance service C) may be selected to serve in a leadership role. The instance of the service having a leadership role may perform additional functions that benefit and/or utilize data from multiple instances of the service across the distributed system. Examples of functions performed by instances of services in a leadership role include, for example, synchronization, atomization, sequential activities, and/or analysis of data from multiple instances of the service). Accordingly, instances of services serving in a leadership role may generally be expected to require a greater allocation of memory than when not serving in a leadership role.

In examples described herein, controller VMs may run a leadership memory management process. For example controller VM 202 may include leadership memory management process 218 and controller VM 220 may include leadership memory management process 230. The leadership memory management processes may be assigned an amount of memory to serve as a dedicated leadership memory pool. For example, the leadership memory management process 218 may be assigned dedicated leadership memory pool 234. The leadership memory management process 230 may be assigned dedicated leadership memory pool 238. The dedicated leadership memory pools may generally be implemented on local memory of a computing node (e.g. Local memory 142 and/or local memory 144 of FIG. 1).

In some examples, a size of the dedicated leadership memory pool may be the same for each computing node in a distributed computing system. In other examples, the size of the dedicated leadership memory pool at each computing node may vary and/or no dedicated leadership memory pool may be provided for some computing nodes. Across the distributed system, the total amount of memory provided for the dedicated leadership memory pool when summed across all computing nodes should be greater than or equal to the expected memory needs for all instances of services on controller VMs serving in a leadership role—e.g. there should be sufficient memory in dedicated leadership memory pools across the distributed system such that each service may have an instance serving in a leadership role that will be able to access memory from a dedicated leadership memory pool on at least one computing node.

During operation, an instance of a service may be selected to take on a leadership role. Selection of which instance should serve in a leadership role may occur in a variety of ways. In some examples, all instances of services may register with a central service—e.g. all instances of services may provide an ID associated with their instance to a central service. The central service may select an instance to serve in a leadership role based on the IDs—for example, an instance with a highest and/or lowest ID may be selected. Other mechanisms for leadership selection may also be used.

In some examples, suppose service A 204 is selected to serve in a leadership role as between service A 204 and service A 222.

The instance selected to serve in a leadership role then requests an amount of memory from the leadership memory management process on its computing node. For example, the service A 204 may request sufficient memory from the leadership memory management process 218. The leadership memory management process 218 checks if sufficient memory is available in the dedicated leadership memory pool for that computing node, e.g. dedicated leadership memory pool 234. If sufficient memory is available to meet the request, the requesting instance of the service may serve in the leadership role. If sufficient memory in the dedicated leadership memory pool 234 is not available to meet the request, the instance of the service may decline to serve in a leadership role. The central service may then select a different instance running on a different computing node to serve in the leadership role (e.g. Service A 222).

In this manner, a dedicated pool of memory may be provided for instances of services serving in a leadership role. This both ensures that memory is available for services in a leadership role, but also limits a total number of instances that may serve in a leadership role at any given computing node. By requiring only a certain amount of memory at each computing node be provided for services in a leadership role, some distribution of leadership services among the computing nodes is likely to be achieved. Note that, using examples described herein, a given computing node may not be required to have memory available for the worst case (e.g. when all and/or a large number of services serving in a leadership role for the distributed system are running on the same computing node).

Figure 3:
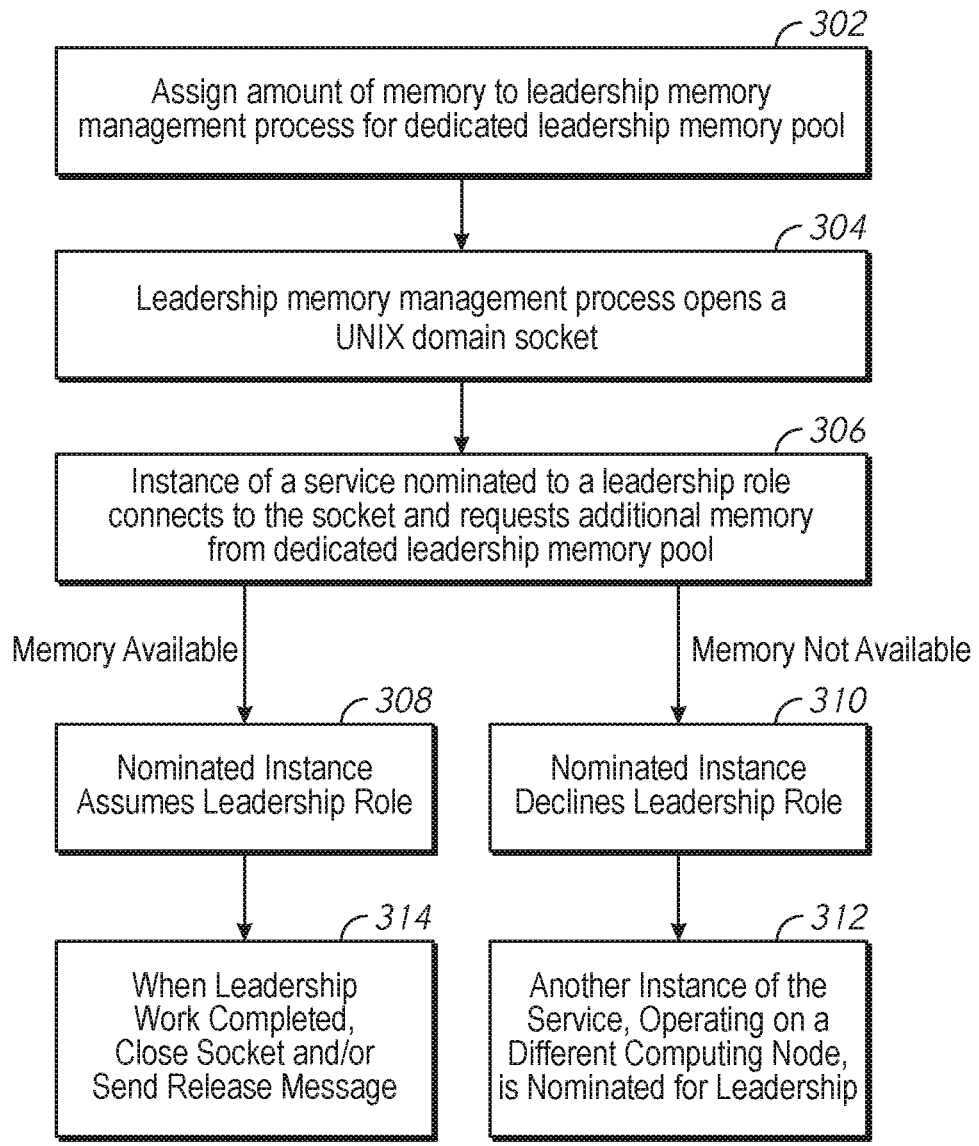
FIG. 3 is a flowchart of a method arranged in accordance with examples described herein.

FIG. 3 is a flowchart of a method arranged in accordance with examples described herein. The example method shown in FIG. 3 provides an example of how memory management using a dedicated leadership memory pool may be implemented. Other implementations may also be possible. In some examples, some blocks may not be present, blocks may be reordered, and/or additional blocks may be used.

In block 302, an amount of memory may be assigned to a leadership memory management process for a dedicated leadership memory pool. For example, at a computing node a memory management process (e.g. the leadership memory management process 218 of FIG. 2) may be assigned an amount of local memory for management (e.g. the dedicated leadership memory pool 234 of FIG. 2). The assignment may be made, for example, by a kernel operating on the computing node, or by another service operating on the computing node. The amount of memory which is assigned may vary be different between different computing nodes in a distributed system, or may be the same in multiple computing nodes in the distributed system. The total size (e.g. total amount) of memory in the distributed system which is assigned to memory management processes for the dedicated leadership memory pool should be sufficient to handle the expected memory needs of all instances of services expected to serve in a leadership role. Note that a single computing node need not have sufficient memory in the dedicated leadership memory pool to support all instances of services having a leadership role, but rather, the memory requirement for leadership may be distributed among computing nodes in the distributed system.

In block 304, the memory management process may open a UNIX domain listening socket. The UNIX domain listening socket is an example of how instances of services may communicate with the memory management process. Other sockets and/or communication mechanisms may be used in other examples. The UNIX domain listening socket may be advantageous in that the connection may be fast and may not require communication through a network.

In block 306, an instance of a service nominated to a leadership role connects to the socket and requests additional memory from the dedicated leadership memory pool. For example, referring back to FIG. 2, if service A 204 is nominated to a leadership role, it may connect to the leadership memory management process 218 over a UNIX domain listening socket and request additional memory from the dedicated leadership memory pool 234. The amount of memory requested may generally be an amount of memory sufficient for the instance of a service nominated to the leadership role to fulfill the leadership role.

An example of a format for the memory request is as follows:

```
{
"command": "memory request",
"client": <string>, # name of process
"bytes": <long>, # number of bytes requested
}
```

In this manner, a service (e.g. a process) may provide a memory request command, along with the name of the process requesting the memory (e.g. the name of the service and/or the instance of the service), and an amount of memory requested. The amount of memory requested may be based on an expected increase in memory needs due to serving in a leadership role.

The memory management process may log received requests for memory. The log may be stored, for example, in local memory of the computing node.

If the amount of requested memory is available in the dedicated leadership memory pool, then block 308 may occur. In block 308, the nominated instance assumes the leadership role and performs leadership tasks. During the time the instances serves in the leadership role, the UNIX domain listening socket opened by the memory management process may remain open.

In block 314, when leadership work is completed and the instance will no longer serve in a leadership role, it may close the UNIX domain listening socket with the memory management process and/or may send a release message to the memory management process. Responsive to the closure of the UNIX domain listening socket and/or the release message, the memory management process may release the memory which had been dedicated to that instance serving in a leadership role. In this manner, the memory management process may manage the dedicated leadership memory pool and ensure it is allocated to only current instances of services operating in a leadership role.

Moreover, if the instance of a service acting in a leadership role were to crash while performing its work (e.g. in block 308), the kernel may clean up the crashed service, recognize the open UNIX domain listening socket and close it accordingly. This may allow the memory management process to recognize that an instance of a service serving in a leadership role is no longer active, and the memory management process may accordingly release the memory which had been allocated for that instance (which has now crashed).

Referring again to block 306, if the requested memory is not available, the nominated instance declines the leadership role in block 310. The nominated instance may provide an indication (e.g. a message) to the service which nominated it to serve in the leadership role (e.g. a central service and/or the memory management process) that it has declined to serve in the leadership role. Responsive to such an indication, another instance of the service, operating on a different computing node, may then be nominated for leadership in block 312. In this manner, another computing node's dedicated leadership memory pool may be used to provide memory for the leadership role.

Figure 4:
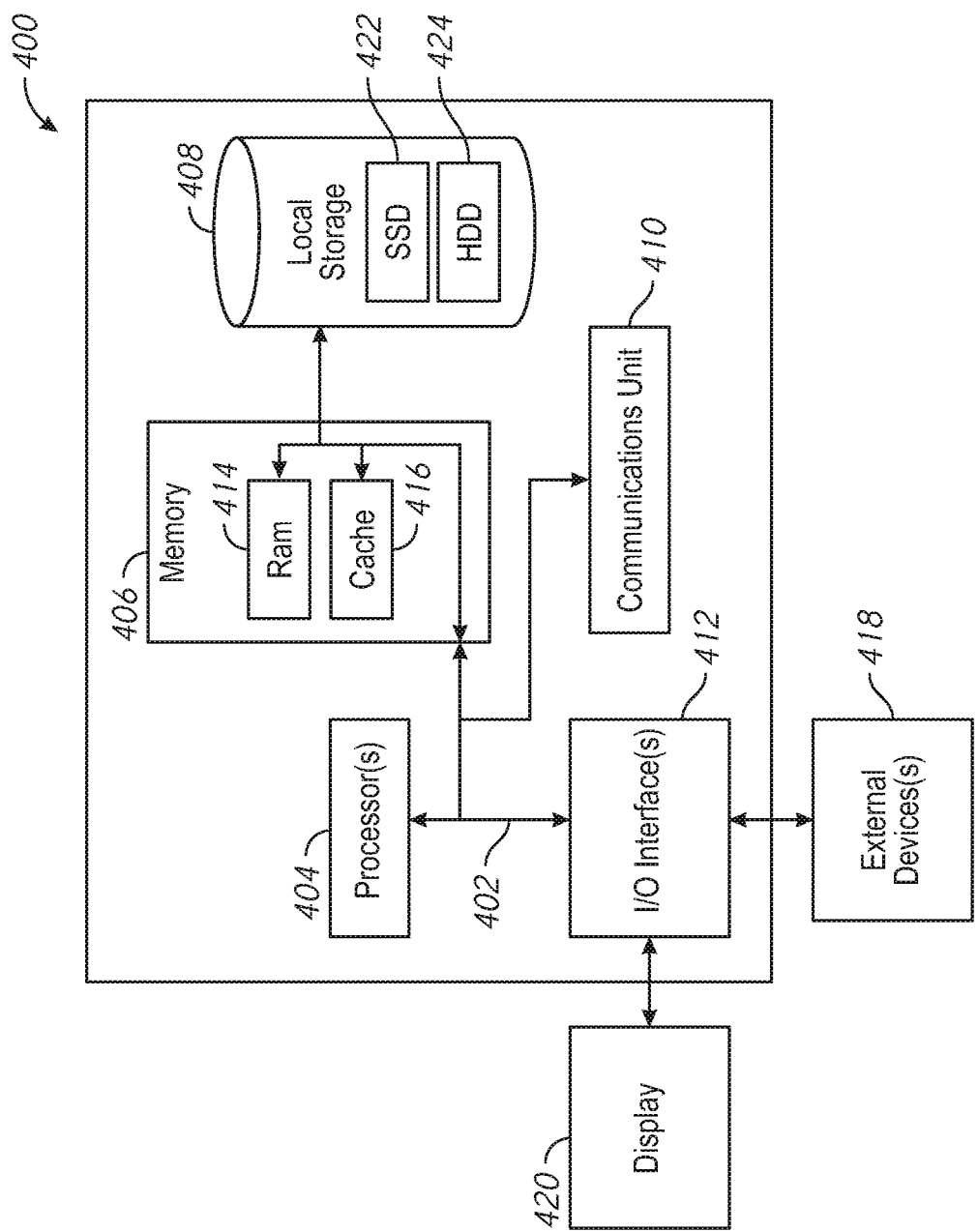
FIG. 4 depicts a block diagram of components of a computing node in accordance with examples described herein.

FIG. 4 depicts a block diagram of components of a computing node 400 in accordance with examples described herein. It should be appreciated that FIG. 4 provides only an illustration of one implementation and does not imply any limitations with regard to the environments in which different embodiments may be implemented. Many modifications to the depicted environment may be made. The computing node 400 may be used to implement and/or may be implemented using the computing node 102 and/or the computing node 112 in some examples. The computing node 400 may further be used to implement the controller VM 202 and/or the controller VM 220 of FIG. 2 in some examples.

The computing node 400 includes a communications fabric 402, which provides communications between one or more processor(s) 404, memory 406, local storage 408, communications unit 410, I/O interface(s) 412. The communications fabric 402 can be implemented with any architecture designed for passing data and/or control information between processors (such as microprocessors, communications and network processors, etc.), system memory, peripheral devices, and any other hardware components within a system. For example, the communications fabric 402 can be implemented with one or more buses.

The memory 406 and the local storage 408 are computer-readable storage media. In this embodiment, the memory 406 includes random access memory RAM 414 and cache 416. In some examples, cache 416 may be integrated with and/or located in the CPU. In general, the memory 406 can include any suitable volatile or non-volatile computer-readable storage media. The local storage 408 may be implemented as described above with respect to local storage 124 and/or local storage 130. In this embodiment, the local storage 408 includes an SSD 422 and an HDD 424, which may be implemented as described above with respect to SSD 126, SSD 132 and HDD 128, HDD 134 respectively. The memory 406 may include a portion of memory designated as all or a portion of a dedicated leadership memory pool.

Various computer instructions, programs, files, images, etc. may be stored in local storage 408 for execution by one or more of the respective processor(s) 404 via one or more memories of memory 406. The instructions may include instructions for performing functions described with respect to memory management processes, service(s), and/or kernels described herein. In some examples, local storage 408 includes a magnetic HDD 424. Alternatively, or in addition to a magnetic hard disk drive, local storage 408 can include the SSD 422, a semiconductor storage device, a read-only memory (ROM), an erasable programmable read-only memory (EPROM), a flash memory, or any other computer-readable storage media that is capable of storing program instructions or digital information.

The media used by local storage 408 may also be removable. For example, a removable hard drive may be used for local storage 408. Other examples include optical and magnetic disks, thumb drives, and smart cards that are inserted into a drive for transfer onto another computer-readable storage medium that is also part of local storage 408.

Communications unit 410, in these examples, provides for communications with other data processing systems or devices. In these examples, communications unit 410 includes one or more network interface cards. Communications unit 410 may provide communications through the use of either or both physical and wireless communications links.

I/O interface(s) 412 allows for input and output of data with other devices that may be connected to computing node 400. For example, I/O interface(s) 412 may provide a connection to external device(s) 418 such as a keyboard, a keypad, a touch screen, and/or some other suitable input device. External device(s) 418 can also include portable computer-readable storage media such as, for example, thumb drives, portable optical or magnetic disks, and memory cards. Software and data used to practice embodiments of the present invention can be stored on such portable computer-readable storage media and can be loaded onto local storage 408 via I/O interface(s) 412. I/O interface(s) 412 also connect to a display 420.

Display 420 provides a mechanism to display data to a user and may be, for example, a computer monitor.

Certain examples described herein have been described in the context of management of memory for services in a leadership role. However, in other examples, systems and methods may be provided for management of other computing resources for services in a leadership role. Generally any computing resource, or combination of resources, may be managed in accordance with techniques described herein. Examples of computing resources, include, but are not limited to, disk or other storage space, network bandwidth, and processor (e.g. CPU) usage.

Figure 5:
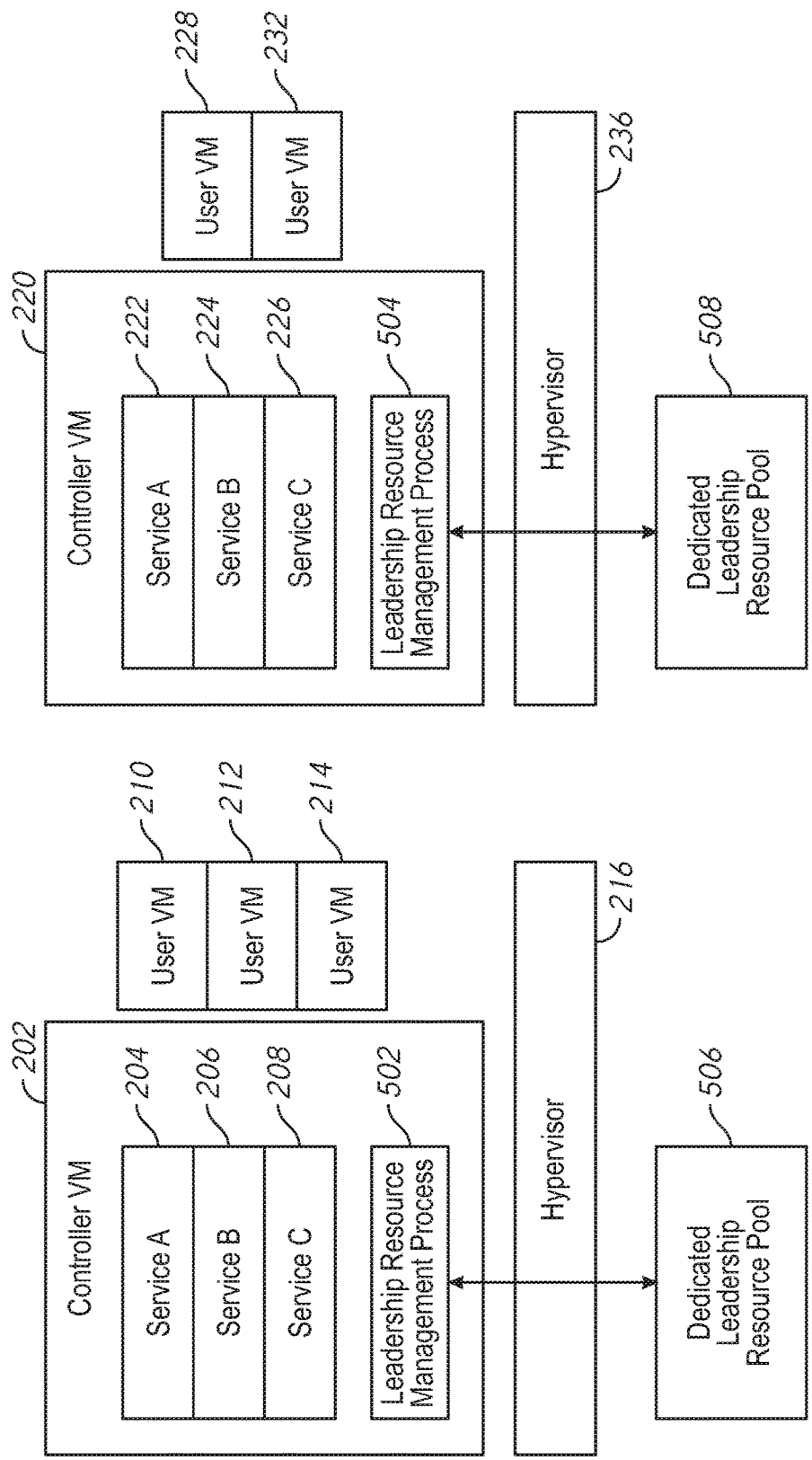
FIG. 5 is a schematic illustration of multiple computing nodes arranged in accordance with examples described herein.

FIG. 5 is a schematic illustration of multiple computing nodes arranged in accordance with examples described herein. FIG. 5 includes many like components with FIG. 2, which share the same reference numbers. FIG. 5, however, provides an example of the management of computing resources other than, or in addition to, memory.

In examples described herein, controller VMs may run a leadership resource management process. For example controller VM 202 may include leadership resource management process 502 and controller VM 220 may include leadership resource management process 504. The leadership resource management processes may be assigned an amount of computing resources to serve as a dedicated leadership resource pool. For example, the leadership resource management process 502 may be assigned dedicated leadership resource pool 506. The leadership resource management process 504 may be assigned dedicated leadership resource pool 508. The dedicated leadership resource pools may generally be implemented as portions of computing resources for a computing node (e.g. local memory 142 and/or local memory 144 of FIG. 1, network bandwidth on network 122 of FIG. 1, disk space on local storage 124 and/or local storage 130 of FIG. 1, and/or local processor usage, e.g. of processor 404 of FIG. 4). One resource or a combination of resources may be managed by leadership resource management processes described herein.

In some examples, a size of the dedicated leadership resource pool may be the same for each computing node in a distributed computing system. In other examples, the size of the dedicated leadership resource pool at each computing node may vary and/or no dedicated leadership resource pool may be provided for some computing nodes. Across the distributed system, the total amount of resources (e.g. a percentage of a particular resource) provided for the dedicated leadership resource pool when summed across all computing nodes should be greater than or equal to the expected needs for that resource for all instances of services on controller VMs serving in a leadership role—e.g. there should be sufficient resources in dedicated leadership resource pools across the distributed system such that each service may have an instance serving in a leadership role that will be able to access memory from a dedicated leadership resource pool on at least one computing node.

During operation, an instance of a service may be selected to take on a leadership role as described herein. The instance selected to serve in a leadership role then requests resources from the leadership resource management process on its computing node. For example, when selected to serve in a leadership role, the service A 204 may request sufficient network bandwidth (or other resource(s)) from the leadership resource management process 502 to serve in the leadership role. For example, the amount of resources requested may be based on an expected increase in resources expected to be needed to perform the leadership role. The dedicated leadership resource pool is available only to services serving in leadership roles The leadership resource management process 502 checks if sufficient resources are available in the dedicated leadership resource pool for that computing node, e.g. dedicated leadership resource pool 506. If sufficient resources are available to meet the request, the requesting instance of the service may serve in the leadership role. If sufficient resources in the dedicated leadership resource pool 506 are not available to meet the request, the instance of the service may decline to serve in a leadership role. The central service may then select a different instance running on a different computing node to serve in the leadership role (e.g. Service A 222).

In this manner, a dedicated pool of resources may be provided for instances of services serving in a leadership role. This both ensures that resources are available for services in a leadership role, but also limits a total number of instances that may serve in a leadership role at any given computing node. By requiring only a certain amount of resources at each computing node be provided for services in a leadership role, some distribution of leadership services among the computing nodes is likely to be achieved. Note that, using examples described herein, a given computing node may not be required to have resources available for the worst case (e.g. when all and/or a large number of services serving in a leadership role for the distributed system are running on the same computing node).

Accordingly, examples of systems and methods described herein may be used to manage a variety of computing resources.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

Those of ordinary skill would further appreciate that the various illustrative logical blocks, configurations, modules, circuits, and algorithm steps described in connection with the embodiments disclosed herein may be implemented as electronic hardware, computer software executed by a processor, or combinations of both. Various illustrative components, blocks, configurations, modules, circuits, and steps have been described above generally in terms of their functionality. Skilled artisans may implement the described functionality in varying ways for each particular application and may include additional operational steps or remove described operational steps, but such implementation decisions should not be interpreted as causing a departure from the scope of the present disclosure as set forth in the claims.

What is claimed is:

1. A method comprising:
responsive to a request for an instance of a service to serve in a leadership role, requesting, by the instance of the service, an amount of resources from a dedicated leadership resource pool based on an expected increase in resources to perform the leadership role, wherein the dedicated leadership resource pool is available only to services serving in leadership roles;
accepting the request to serve in the leadership role when the amount of resources are available in the dedicated leadership resource pool; and denying the request to serve in the leadership role when the amount of resources are unavailable in the dedicated leadership resource pool.

2. The method of claim 1, wherein said requesting comprises requesting of a resource management process running on a controller virtual machine, wherein the resource management process is configured to manage the dedicated leadership resource pool.

3. The method of claim 2, wherein said dedicated leadership resource pool comprises a dedicated leadership memory pool and wherein said resource management process comprises a memory management process.

4. The method of claim 3, wherein said requesting comprises connecting to a UNIX domain listening socket.

5. The method of claim 4, further comprising maintaining the UNIX domain listening socket open during a duration of time spent serving in the leadership role.

6. The method of claim 5, further comprising closing the UNIX domain listening socket when finished serving in the leadership role.

7. The method of claim 5, further comprising sending a release message to the memory management process when finished serving in the leadership role.

8. A computing node comprising:
at least one processor;
a dedicated leadership resource pool; and
a memory storing instructions that, when executed by the at least one processor, configure the computing node to:
responsive to a request for an instance of a service to serve in a leadership role, requesting, by the instance of the service, an amount of resources from the dedicated leadership resource pool based on an expected increase in resources to perform the leadership role, wherein the dedicated leadership resource pool is available only to services serving in leadership roles;
accept the request to serve in the leadership role when the amount of resources are available in the dedicated leadership resource pool; and
deny the request to serve in the leadership role when the amount of resources are unavailable in the dedicated leadership resource pool.

9. The computing node of claim 8, wherein said requesting comprises requesting of a resource management process run on a controller virtual machine on the computing node, wherein the resource management process is configured to manage the dedicated leadership resource pool.

10. The computing node of claim 9, wherein said dedicated leadership resource pool comprises a dedicated leadership memory pool, and wherein said resource management process comprises a memory management process.

11. The computing node of claim 10, wherein said requesting comprises connecting to a UNIX domain listening socket.

12. The computing node of claim 11, wherein the instructions further configure the computing node to maintain the UNIX domain listening socket open during a duration of time spent by the instance of the service serving in the leadership role.

13. The computing node of claim 12, wherein the instructions further configure the computing node to close the UNIX domain listening socket when the instance of the service is finished serving in the leadership role.

14. The computing node of claim 12, wherein the instructions further configure the computing node to send a release message to the memory management process when the instance of the service is finished serving in the leadership role.

15. A method comprising:
at each of a plurality of computing nodes of a distributed system, allocating a portion of computing resources to a dedicated leadership resource pool;
selecting one of a plurality of instances of a service to serve in a leadership role, wherein the selected one of the plurality of instances is operating on a first node of the plurality of computing nodes;
receiving an indication the selected one of the plurality of instances declined to serve in the leadership role based on lack of sufficient resources in the dedicated leadership resource pool of the first node; and
selecting another one of the plurality of instances of the service to serve in the leadership role, wherein the another one is operating on a different node than the first node.

16. The method of claim 15, wherein a size of the portion of resources is selected such that a total size of the dedicated leadership resource pool across the plurality of computing nodes is sufficient for all expected instances of services serving in leadership roles.

17. The method of claim 16, wherein the dedicated leadership resource pool comprises a dedicated leadership memory pool.

18. The method of claim 17, further comprising opening a UNIX domain listening socket, and receiving a request on the UNIX domain listening socket for memory from the dedicated leadership memory pool from the selected one of the plurality of instances.

19. The method of claim 18, further comprising logging the request.

20. The method of claim 16, wherein the plurality of instances of the service are configured to perform a common function in the distributed system.

21. The method of claim 20, wherein a first resource requirement to serve in the leadership role is greater than a second resource requirement to perform the common function.

22. At least one non-transitory computer-readable storage medium including instructions that when executed by computing nodes in a distributed computing system, cause at least one of the computing nodes to:
at each of a plurality of computing nodes of a distributed system, allocate a portion of computing resources to a dedicated leadership resource pool;
select one of a plurality of instances of a service to serve in a leadership role, wherein the selected one of the plurality of instances is operating on a first node of the plurality of computing nodes;
receive an indication the selected one of the plurality of instances declined to serve in the leadership role based on lack of sufficient resources in the dedicated leadership resource pool of the first node; and
select another one of the plurality of instances of the service to serve in the leadership role, wherein the another one is operating on a different node than the first node.

23. The at least one computer-readable storage medium of claim 22, wherein a size of the portion of resources is selected such that a total size of the dedicated leadership resource pool across the plurality of computing nodes is sufficient for all expected instances of services serve in leadership roles.

24. The at least one computer-readable storage medium of claim 23, wherein the plurality of instances of the service are configured to perform a common function in the distributed system.

25. The at least one computer-readable storage medium of claim 24, wherein a first resource requirement to serve in the leadership role is greater than a second resource requirement to perform the common function.

26. The at least one computer-readable storage medium of claim 22, wherein the dedicated leadership resource pool comprises a dedicated leadership memory pool.

27. The at least one computer-readable storage medium of claim 26, wherein the instructions further configure the computing nodes to open a UNIX domain listening socket, and receive a request on the UNIX domain listening socket for memory from the dedicated leadership memory pool from the selected one of the plurality of instances.

28. The at least one computer-readable storage medium of claim 27, wherein the instructions further configure the computing nodes to log the request.

* * * * *